United States Patent [19]

Cook et al.

[11] 4,102,987

[45] Jul. 25, 1978

[54] PROCESS FOR PREPARING SULFURYL-FLUORIDE AND -CHLOROFLUORIDE PRODUCTS

[75] Inventors: David M. Cook, Pittsburgh; Douglas C. Gustafson, Antioch, both of Pa.

[73] Assignee: The Dow Chemical Company, Midland, Mich.

[21] Appl. No.: 789,311

[22] Filed: Apr. 20, 1977

Related U.S. Application Data

[63] Continuation of Ser. No. 616,517, Sep. 25, 1975, abandoned.

[51] Int. Cl.² .................... C01B 7/24; C01B 17/45
[52] U.S. Cl. .................................... 423/466; 423/467; 423/468
[58] Field of Search .............................. 423/466–468

[56] References Cited

U.S. PATENT DOCUMENTS

| | | | |
|---|---|---|---|
| 2,562,432 | 7/1951 | McCann et al. | 423/467 X |
| 2,772,144 | 11/1956 | Belf | 423/468 |
| 3,092,458 | 6/1963 | Ruh et al. | 423/468 |
| 3,320,030 | 5/1967 | Bisignani et al. | 423/466 |
| 3,403,144 | 9/1968 | Lam et al. | 423/468 |
| 3,714,336 | 1/1973 | Davis et al. | 423/468 |
| 3,850,542 | 11/1974 | Barnard et al. | 423/468 |

*Primary Examiner*—Earl C. Thomas
*Attorney, Agent, or Firm*—Gary D. Street

[57] ABSTRACT

A product mixture resulting from the reaction of an anhydrous gaseous mixture of sulfur dioxide, chlorine and hydrogen fluoride in the presence of a catalyst is heated at a temperature of at least about 35° C. under pressures up to about 65 psi to effect substantial conversion of undesired free chlorine in the resulting product mixture to sulfuryl chlorofluoride. The conversion of free chlorine to sulfuryl chlorofluoride allows the use of a completely anhydrous process from which uncontaminated sulfuryl fluoride and sulfuryl chlorofluoride products can readily be obtained. A method for the production of sulfuryl chlorofluoride from said gaseous mixture is also provided.

7 Claims, No Drawings

PROCESS FOR PREPARING SULFURYL-FLUORIDE AND -CHLOROFLUORIDE PRODUCTS

CROSS-REFERENCE TO RELATED APPLICATION

This is a continuation, of application Ser. No. 616,517 filed Sept. 25, 1975 now abandoned.

BACKGROUND OF THE INVENTION

This invention relates to a process for the recovery of sulfuryl fluoride and sulfuryl chlorofluoride substantially free of undesired chlorine contaminant. In accordance with another aspect, this invention relates to a method of preparing sulfuryl chlorofluoride from a reaction mixture of sulfur dioxide, chlorine and hydrogen fluoride.

The preparation of sulfuryl fluoride ($SO_2F_2$) from an anhydrous gaseous mixture of sulfur dioxide ($SO_2$), chlorine ($Cl_2$) and hydrogen fluoride (HF) in the presence of a catalyst at temperatures of from about 150 to about 450° C., preferably above about 200° C., is conventional in the art. U.S. Pat. Nos. 2,772,144, 3,092,458, and 3,320,030 all relate to such manufacture of $SO_2F_2$ while U.S. Pat. No. 2,875,127 relates to the use of $SO_2F_2$ as a fumigant. It is the usual prior art practice to pass the $SO_2F_2$ product reaction mixture exiting from a reactor through an aqueous scrubber system to recover many of the undesired by-products or unused reactants, e.g., $Cl_2$, $SO_2$, HCl and $SO_2ClF$, before recovering the final product. The presence of free chlorine in the final product is undesired in view of its highly corrosive nature; such free chlorine cannot readily be distilled from the desired product in view of the azeotrope mixture that Applicants believe forms with sulfuryl fluoride and the use of aqueous scrubbers taught in the art is unsatisfactory as they do not completely remove the free chlorine content. Moreover, these methods suffer other disadvantages on account of numerous attendant pollution problems associated with such aqueous effluent waste streams, as well as the economic loss of valuable unused reactants and hydrogen chloride by-product.

The production of $SO_2ClF$ by reacting $SO_2$, HF and $Cl_2$ in the presence of activated carbon catalyst and an alkali metal bifluoride at 100°-200° C. is also taught by the U.S. Pat. No. 3,320,030 mentioned above. Various other processes utilizing different reactants, e.g., $KSO_2F$ and $Cl_2$, $SO_2Cl_2$ and $SbF_3$, $CoF_3$, $AgF_2$, $MnF_3$, $NH_4F$, $NH_4HF_2$ and the like are also taught in the art but are not considered as pertinent as the teachings of the U.S. Pat. No. 3,320,030.

Accordingly, an object of this invention is to provide an improved process whereby $SO_2F_2$ substantially free of chlorine can be obtained without the employment of aqueous scrubbing systems.

Another object of the present invention is to provide a method whereby $SO_2ClF$ can be produced from excess chlorine contained in an $SO_2F_2$ product reaction mixture.

Other objects and aspects, as well as several advantages of the invention, will become apparent upon consideration of the accompanying disclosure and the appended claims.

SUMMARY OF THE INVENTION

Unexpectedly, it has been found that if a product reaction mixture resulting from the contacting of sulfur dioxide, chlorine and hydrogen fluoride in the presence of an activated charcoal catalyst is subjected to further reaction, undesired free chlorine present in the product reaction mixture and in the desired final product, $SO_2F_2$, can be substantially eliminated. Thus, in accordance with one embodiment of the invention, a process is provided wherein a product mixture, comprising sulfuryl fluoride and resulting from the reaction of an anhydrous gaseous mixture of sulfur dioxide, chlorine and hydrogen fluoride in the presence of a catalyst comprising activated carbon, is reacted at a reaction temperature of at least about 35° C. and reaction pressures of from atmospheric to about 65 psi in the presence of a catalyst comprising activated carbon, thereby reducing the free chlorine content of said mixture by converting the same to sulfuryl chlorofluoride.

In accordance with another embodiment of the invention, the resulting $SO_2ClF$ is recovered from the $SO_2F_2$ product mixture. In still another embodiment, $SO_2F_2$ substantially free of chlorine is separated from the product mixture.

In another embodiment of the invention, it has unexpectedly been found that an anhydrous gaseous mixture of $SO_2$, $Cl_2$ and HF can be reacted, in the presence of a catalyst comprising activated carbon, directly to a substantially chlorine free $SO_2ClF$ product under the conditions of the present invention with little or no formation of $SO_2F_2$.

Advantageously, the present invention provides a completely anhydrous process by which $SO_2F_2$ and $SO_2ClF$ can be continuously produced substantially free of $Cl_2$, thus obviating the steps of product purification by conventional aqueous recovery methods.

DESCRIPTION OF PREFERRED EMBODIMENTS

The invention is not dependent upon specific reaction conditions concerning the initial formation of the $SO_2F_2$ containing product reaction mixture from which undesired free chlorine is to be removed. These conditions are generally well known in the art as set forth in the Background herein. Generally, the product reaction mixture comprising $SO_2F_2$ as prepared by the prior art methods also contains $SO_2$, HF, HCl and undesired free $Cl_2$. A typical such product reaction mixture is prepared by reacting an anhydrous mixture of about 1.0 mole $Cl_2$, about 1.35 mole $SO_2$ and from 2.5 to about 4.5 mole HF. The product reaction mixture thus obtained usually comprises 1.0 mole $SO_2F_2$, 0.35 mole $SO_2$, up to about 2.5 mole HF and varying amounts, e.g., from 50 to about 10,000 ppm or more of free $Cl_2$. The amount of undesired free $Cl_2$ may vary considerably depending upon the condition of the carbon catalyst and the amount of $Cl_2$ initially used. As used herein, the term "$Cl_2$ removal" is understood to be synonymous with "$Cl_2$ conversion to $SO_2ClF$".

Such undesired excess chlorine is substantially, if not completely, reduced by the method of the present invention wherein the $SO_2F_2$ product reaction mixture containing free $Cl_2$ is further reacted over a catalyst comprising activated carbon. Whether or not the excess $Cl_2$ exists as free excess chlorine per se in the product reaction mixture or as $SO_2Cl_2$ is not definitely known. However, $SO_2Cl_2$ readily disassociates to $SO_2$ and $Cl_2$ or reacts in analysis methods as $SO_2Cl_2$ and substantially all of the $Cl_2$ can, within the limits of detection, irrespectively be removed.

The minimum reaction temperature employed to obtain substantial $Cl_2$ removal may range from about 35° to about 145° C., the exact reaction temperature being dependent upon the reaction pressures and feed rates employed. Reaction pressures of from atmospheric to about 65 psi are typically employed. Usually, a pressure of at least about 1-2 psi is employed to move the reaction mixture through the reactor. It has also been observed that, as the reaction pressure is increased, the reaction temperature must likewise be increased in order to maintain substantial conversion of the free $Cl_2$ to $SO_2ClF$. Thus, at reaction pressures near atmospheric and a reaction temperature of about 35° C., the minimum reaction temperature must generally be increased about 10° C. for every increase of from about 6 to 8 psi in order to maintain the recovery of $SO_2F_2$ and/or $SO_2ClF$ products substantially free of $Cl_2$. Thus, for example, at pressures slightly above atmospheric, e.g., 1-2 psi, the minimum temperature required to maintain substantial, if not complete, removal of $Cl_2$ is about 35-40° C. Temperatures of from about 35 to about as high as 100° C. at this pressure range can be employed and substantial removal of $Cl_2$ obtained. However, at such pressures, the removal of $Cl_2$ begins to decrease as the temperature is increased to above about 100° C. The maximum temperature which can be employed to accomplish substantial removal of $Cl_2$ may thus be higher than the minimum required temperature at a given pressure. Generally, however, the range between the minimum and maximum temperatures wherein substantial $Cl_2$ removal is obtained will decrease due to reaction kinetics as the operating pressures are increased, the maximum temperature being limited to approximately 145° C. at about 65 psi. The exact minimum and maximum temperatures can, of course, be readily determined by test runs using the $Cl_2$ analysis methods as hereinafter set forth. Temperatures above or below the maximum or minimum temperatures can, of course, be utilized where the presence of free $Cl_2$ in the $SO_2F_2$ or $SO_2ClF$ products can be tolerated.

For the purposes of the present invention wherein substantial $Cl_2$ removal by conversion thereof to $SO_2ClF$ is desired, and where $SO_2F_2$ and/or $SO_2ClF$ products free of $Cl_2$ are desired, minimum temperatures of from about 35 to about 145° C. and pressures of from about atmospheric to about 65 psi can be employed. Economic considerations in plant construction, etc., dictate that lower pressures ordinarily be utilized. In a preferred embodiment, minimum reaction temperatures of from 40 to about 120° C. at pressures of from atmospheric to about 50 psi are employed. In another preferred embodiment, minimum reaction temperatures of from about 40° to about 100° C. at pressures of from about 2 to about 37 psi are employed.

Any of the commercially available activated carbons may be employed as catalysts in the present invention. Advantageously, the process of the present invention effectively converts excess $Cl_2$ to $SO_2ClF$ with little apparent effect on the catalyst employed.

Another consideration involved in the practice of the present invention is residence or contact time. Those skilled in the art recognize that this element is highly variable depending upon such other factors as reaction temperature, type of apparatus, overall size of a specific operation and the like. For any particular operation with given apparatus equipment, determination of process variables such as optimum reaction temperature, pressure and contact time is within the skill of the art, and may be determined by test run.

Generally, the contact time can be from about 1 to 10 or more seconds. Preferably, the contact time of the claimed process is about one-half the contact time of the initial reactants used to prepare the $SO_2F_2$ containing reaction mixture. A preferred contact time is from about 1 to about 4 seconds.

Apparatus constituting the reactor and related accessories are simple and, along with the product recovery systems following the reactor, may be along the lines described in the appended examples. Those skilled in the art will readily recognize such equipment, as well as other conventional equipment set forth in the references cited in the Background herein which can be employed for the purposes of the present invention. While a second reactor, essentially the same as the first reactor used to react $SO_2$, $Cl_2$ and HF to a product reaction mixture containing $SO_2F_2$, is conveniently employed, the use of a single reactor to accomplish both the formation of $SO_2F_2$ and the removal of $Cl_2$ from such product mixture containing $SO_2F_2$ to form $SO_2ClF$ is within the scope of the present invention.

The process of the present invention can be monitored with respect to the removal of $Cl_2$ and the production of $SO_2ClF$ by analysis of the gaseous mixture obtained from the reaction. In such operations, a sample of the gaseous mixture is reacted with a propylene and nitrogen mixture and the resulting mixture analyzed by gas phase chromatography for propylene dichloride, which will be formed by reaction with excess $Cl_2$ or $SO_2Cl_2$ present. Amounts as low as about 50 ppm $Cl_2$ can be detected by such analysis method.

The following examples illustrate practice of the invention.

EXAMPLE 1

A 10 inch long, three-fourth inch diameter Hastelloy C reactor tube was packed with 9 × 10 mesh PCB coconut charcoal and maintained at a temperature of about 180° C. An anhydrous gaseous mixture comprising about 1.0 mole $Cl_2$, about 1.35 moles $SO_2$ and about 4.5 moles HF was metered thereto at about 12 psi with an average contact time of the mixture in the reactor of about 5 seconds. The product reaction mixture comprising $SO_2F_2$, $SO_2$, HF and HCl in mole ratios of about 1.0: .35 : 2.5 : 2.0 and containing detectable amounts of $Cl_2$ and/or $SO_2Cl_2$ was fed into a second similar 5" × ¾" packed reactor. The temperature of the second reactor was about 65° C. and the pressure was about 12 psi. The product reaction mixture contact time in the second reactor was about 2.5 seconds.

Analysis of the mixture exiting the second reactor indicated the presence of $SO_2F_2$, HCl, $SO_2$, HF and $SO_2ClF$. Reaction of the mixture exiting the second reactor with propylene diluted with nitrogen and analysis of the resulting mixture for propylene dichloride content by means of gas phase chromatography was carried out. Within the limits of detection of the analytical method, no propylene dichloride was found, indicating the absence of $Cl_2$ or $SO_2Cl_2$ in the product mixture.

EXAMPLE 2

Utilizing equipment and procedures as in Example 1, the product reaction mixture exiting the first reactor was reacted at about 43° C. and about 2 psi for a period of about 2.5 seconds. The gaseous product mixture exiting the second was similarly analyzed with no detectable $Cl_2$ being found.

In similar operations, it was found that $SO_2F_2$ products having no detectable $Cl_2$ levels could be obtained at temperatures of from about 43 to about 100° C. at a pressure of about 2 psi.

EXAMPLE 3

In other operations utilizing a 20 foot long, 2-inch diameter Hastelloy C reactor tube packed with 4 × 10 mesh PCB coconut charcoal catalyst, typical $SO_2F_2$ containing reaction mixtures therefrom having from 2000 to 3000 or more ppm $Cl_2$ have been found to have no detectable $Cl_2$ or $SO_2Cl_2$ levels after treatment in a second similar reactor of 10 feet in length and being operated at about 100° C. and about 35 psi.

EXAMPLE 4

A first reactor similar to that described in Example 1 above but having an inactive catalyst producing little or no $SO_2F_2$ from the reaction of $Cl_2$, $SO_2$ and HF and producing a product reaction mixture containing some $SO_2ClF$ and high amounts, i.e., about 20,000 ppm of $Cl_2$ at about 180° C. and 2 psi was utilized to determine the effect of temperature and catalyst conditions on the removal of $Cl_2$. In such operations, the reactor was operated at lower temperatures of about 100° C. at 2 psi and a similar gaseous mixture of about 1.0 mole $Cl_2$, 1.35 mole $SO_2$ and about 4.5 mole HF being fed thereto. The gaseous mixture exiting therefrom was analyzed and found to have no detectable $Cl_2$ or $SO_2Cl_2$ and full conversion to $SO_2ClF$. Such results clearly indicate the effectiveness of the present process for preparing a substantially $Cl_2$ free $SO_2ClF$ product from $SO_2$, HF and $Cl_2$ and demonstrate that a long catalyst life for the process could be expected.

Data from various other runs with other similar equipment confirm the effectiveness of the process in $Cl_2$ removal and conversion to $SO_2ClF$.

Various modifications may be made in the process of the present invention without departing from the spirit or scope thereof and it is to be understood that we limit ourselves only as defined in the appended claims.

We claim:

1. A process for removing chlorine from a product reaction mixture comprising sulfuryl fluoride and prepared by the reaction of an anhydrous gaseous mixture of sulfur dioxide, chlorine and hydrogen fluoride in the presence of a catalyst comprising activated carbon, said process comprising reacting the product reaction mixture at a temperature of from about 35° to about 145° C. and at a pressure of from about atmospheric to about 65 psi in the presence of a catalyst comprising activated carbon, thereby reducing the free chlorine content of said mixture and converting free chlorine present in said product reaction mixture to sulfuryl chlorofluoride and thereafter separating $SO_2F_2$ from the product reaction mixture.

2. The process of claim 1 wherein sulfuryl chlorofluoride is recovered from the product mixture.

3. The process of claim 1 wherein the sulfuryl fluoride product recovered contains no detectable levels of free chlorine.

4. The process of claim 3 wherein the sulfuryl chlorofluoride product recovered contains no detectable levels of free chlorine.

5. The process of claim 1 wherein the pressure range is from about atmospheric to about 50 psi and the reaction temperature range is from about 40 to about 120° C.

6. The process of claim 1 wherein pressures of from about 2 to about 37 psi are employed and the reaction temperature range at such pressures is from about 40 to about 100° C.

7. The process as defined in claim 1 wherein the anhydrous gaseous mixture comprises about one mole of chlorine, about 1.35 moles of sulfur dioxide and about 4.5 moles of hydrogen fluoride and wherein the product reaction mixture comprises about 1 mole of sulfuryl fluoride, about 0.35 moles of sulfur dioxide, about 2.5 moles of hydrogen fluoride, about 2 moles of hydrogen chloride and free chlorine.

* * * * *